United States Patent [19]

Christensen

[11] Patent Number: 4,817,654

[45] Date of Patent: Apr. 4, 1989

[54] RETRACTABLE VEHICLE COVER AND APPARATUS THEREFOR

[76] Inventor: Mary Jane Christensen, 4650 Dulin Rd., #122, Fallbrook, Calif. 92028

[21] Appl. No.: 208,762

[22] Filed: Jun. 20, 1988

[51] Int. Cl.$^4$ ............................................. E04H 15/04
[52] U.S. Cl. ........................................ 135/90; 135/98
[58] Field of Search .................. 135/90, 98, 101, 102; 52/64, 63

[56] References Cited

U.S. PATENT DOCUMENTS

| | | | |
|---|---|---|---|
| 645,890 | 3/1900 | Conrad | 135/90 X |
| 969,899 | 9/1910 | Partington | 135/90 |
| 1,279,596 | 9/1918 | Sharbondy | 135/90 |
| 1,759,628 | 5/1930 | Pellegrino | 135/90 |
| 1,801,247 | 4/1931 | Rush | 135/90 |
| 2,440,557 | 4/1948 | Power | 135/90 |
| 2,757,678 | 8/1956 | Stahl | 135/90 |
| 3,482,585 | 12/1969 | Overstreet | 135/90 |

FOREIGN PATENT DOCUMENTS 333240 8/1936 Italy ........................................ 135/90

Primary Examiner—J. Karl Bell
Attorney, Agent, or Firm—John J. Murphey

[57] ABSTRACT

An apparatus for alternately raising a cover into a storage configuration adjacent an overhead support, like a carport roof, and lowering it over a vehicle parked thereunder and including a plurality of hollow tubes extending outward in radial pattern from a position centered over the vehicle, an upper frame of a plurality of bendable rods attached together in end-to-end fashion about the perimeter of the vehicle, a lower frame made similarly for positioning about the lower perimeter of the vehicle, a series of cover control lines attached at various points to the lower frame passing upward therefrom and through the tubes inward toward the hub and upward toward the overhead structure, a shaft mounted adjacent the overhead structure, and a sheet-like cover covering the tubes and frames for positioning over the vehicle and arranged for being retracted up to the overhead structure when not in use.

11 Claims, 4 Drawing Sheets

RETRACTABLE VEHICLE COVER AND APPARATUS THEREFOR

BACKGROUND OF THE INVENTION

1. Field of the Invention

This invention pertains to protective devices for motor vehicles. More particularly, it pertains to an apparatus to lower a cover over a vehicle to shield it from the elements and raise it to a storage position almost out of sight when not in use.

2. Description of the Prior Art

In many parts of the United States, population density, lot size or governmental regulations prevent the establishment of an enclosed garage adjacent or as part of a residence in which to store the family vehicle. Particularly, in the western part of the United States and more specifically in retirement communities, enclosed garages are not used and an overhanging roof or "carport" is all that is possible under which to store an automobile.

Carport storage is effective to protect the vehicle from precipitation; however, it is still exposed to wind, dirt, smog and frost—elements which cause deterioration to the exterior as well as to the interior surfaces thereof. Accordingly, in areas where rigid coverage of a vehicle is not possible, some other form of covering, in addition to the overhanging roof, is desirable to prolong the life of the family car.

For the younger set, a cloth cover is easily and conveniently draped over the vehicle and, in many cases, form fit using elastic belting about the edge to gather the cover under the fender wells of the vehicle. Unfortunately, placing such a cover over a vehicle and pulling it and tugging it to conform to its curvature is a task often difficult or impossible for many people, especially those whose range of mobility may be restricted due to age or infirmity. Further, manually installed covers collect dirt and are difficult to put on and take off without soiling one's clothes. Still further, manually installed covers involve time to take off, fold up and put away, time that is valuable to many persons. Nevertheless, covers are still desirable and a wide range of people need a safe and timely way to use them.

Attempts have been made to hang covers from carports or other overhead supports and adapt them by ropes, winches and pulleys to be lowered over a vehicle parked thereunder and later retracted up into a storage configuration. These attempts have not been successful and the many problems encountered have not been solved.

These problems include the cover hanging down too far from above the vehicle so that wind and wind gusts will blow it off the vehicle; the plurality of messy lines extending from the winches and pulleys that render the device aesthetically undesirable for installation next to a well-kept home: the complexity of the devices that make them exceedingly hard to install and use; the difficulty in using them when attached to a slanted overhanging support such as a carport roof; and the general problems of using a plurality of ropes, lines and pulleys such that a slip of one line will throw the whole device out of alignment. Finally, there are so many ropes to be pulled and wrapped about cleats to hold the covers in the desired position over the vehicle that the task becomes too strenuous for many people. These problems remained unsolved so that today, there are few retractable cover devices available on the market.

SUMMARY OF THE INVENTION

This invention is a novel apparatus for alternately raising a cover into a storage configuration and lowering it over a vehicle parked thereunder by the simple use of very few ropes or lines. The apparatus is compact and made of relatively few parts. Few control lines are provided for operating the device and are centralized to retain them out of sight for the most part. They are adapted to remain in alignment throughout the raising and lowering of the cover. This novel device includes a cover that is snug to the vehicle and of a low silhouette to eliminate wind-blowing problems. Further, a valance or sash may be provided to assist in covering the vehicle and has a secondary use in shielding the device and its parts from view external the home when the cover is raised into its storage position adjacent the underside of the carport roof.

Still further, the device is simple in design and rugged in construction and easily made into kit form for installation by the home owner. A particularly novel feature is to mount the device in a horizontal position from an overhead support regardless of the slant thereof.

Accordingly, the main object of this invention is a simple and rugged apparatus for raising and lowering a cover over a vehicle parked thereunder that is adaptable to be hung or mounted to an overhead support of varying degrees of levelness. Other objects include a device for storing a cover and being shielded from view when retracted into the storage position and a cover including a valance for shielding the lower part of the vehicle such as to prevent wind, frost and dust from being swept underneath the cover up onto the vehicle. Finally, this invention is a simple device of relatively few parts that is available in kit form for installation by the homeowner in a variety of locations to provide convenient covering to a wide range of different sized vehicles.

These and other objects of the invention will become more apparent upon reading the following description of the preferred embodiments taken together with the drawings attached hereto. The scope of protection sought by the inventor may be gleaned from a fair reading of the claims that conclude this specification.

DESCRIPTION OF THE PREFERRED EMBODIMENT

Figure 1:
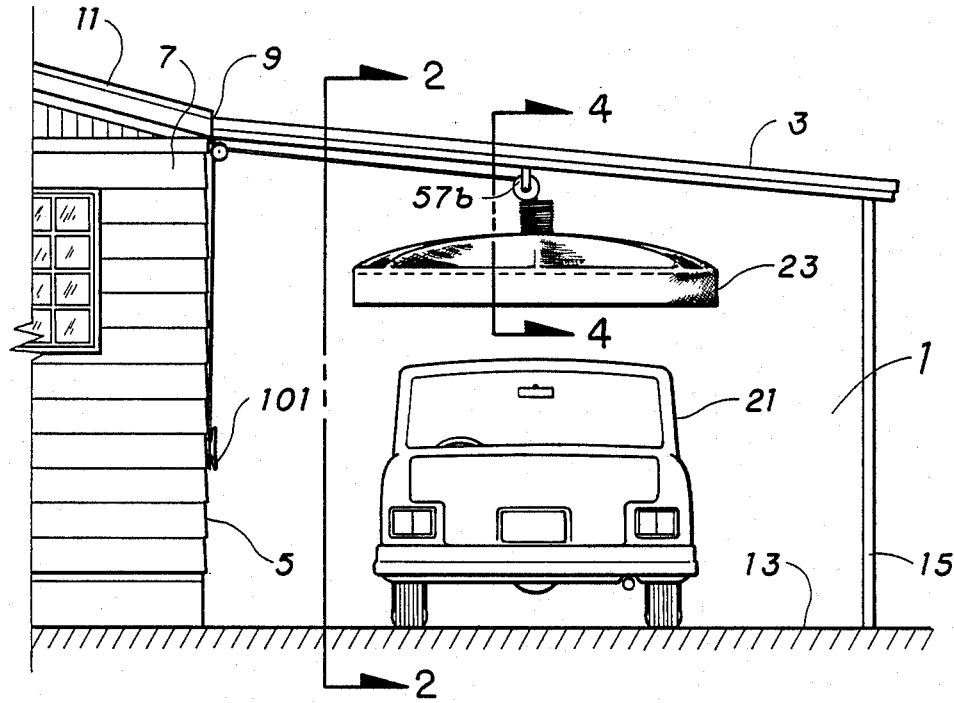
FIG. 1 is an end elevational view of a carport adjacent a house or mobile home showing a typical vehicle parked therein with the cover retracted up into storage under the slanted roof.
Figure 2:
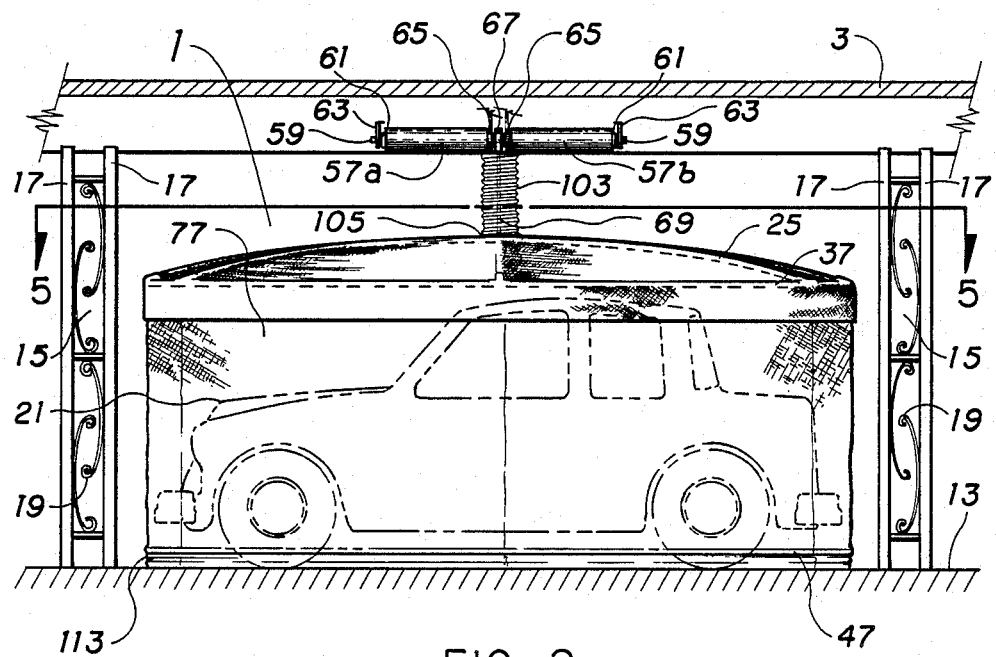
FIG. 2 is a side elevational view of the same carport and vehicle taken along lines 2—2 in FIG. 1 with the cover lowered over the vehicle.

Turning now to the drawings wherein like elements are identified with like numerals throughout the eight figures, FIG. 1 shows a typical use of this invention hung in a carport 1 from an overhead structure 3, such as a roof, extending from the side wall 5 of a mobile home 7. Structure 3 is attached at one end 9 at the roof 11 of home 7 and supported over the floor 13 of carport 1 by supports 15 that are shown in FIG. 2 to comprise a pair of parallel, spaced-apart rails 17 attached together by wrought iron work 19. A vehicle, such as an automobile 21, is parked on floor 13 directly beneath the invention.

The invention is shown in its storage position in FIG. 1, hidden by a valance or sash 23 that is made a part of the cover as will be more fully explained.

As shown in FIGS. 2-5, a plurality of thin-walled, hollow tubes 25 extending outward in a radial pattern from a circular hub 27 that is centered over the geometric center of the vehicle and retained thereon by clips 29. Tubes 25 each have a first end 31, that are positioned inside hub 27, and a second end 33 that terminate slightly beyond the outer perimeter 35 of vehicle 21 and are arranged in roughly equal, spaced-apart positions about perimeter 35. Tubes 25 may be conveniently made of plastic such as polyvinyl chloride and the like and chosen in such a size to accommodate a thin rope or line passing through the center thereof as well as of a wall thickness that will allow them to bend when a cover is placed over them, as will be hereinafter more fully explained.

Figure 6:
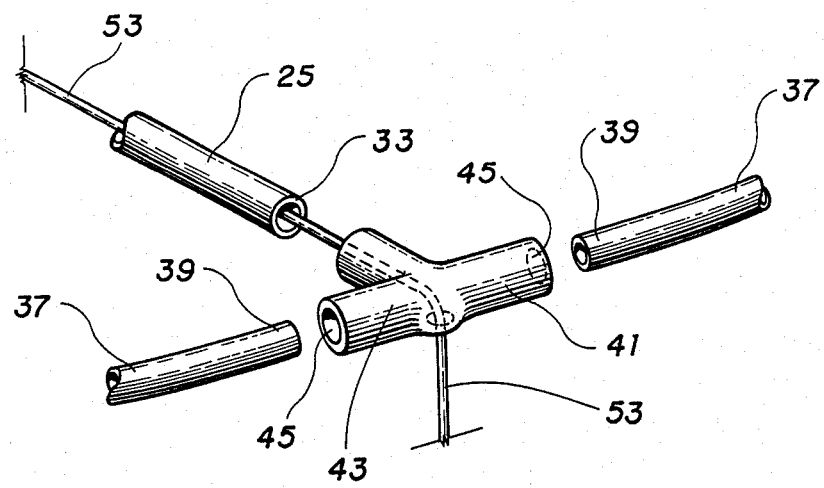
FIG. 6 is an illustrative top view of the fitting between the cover support tubes, the upper frame rods and one of the cover control lines.

An upper frame 37 is formed from a plurality of bendable rods 39 attached together in end-to-end fashion with tube second ends 33 with fittings 41 as shown in FIG. 6. Rods 39 may be either hollow or solid and preferably made of plastic. They may be conveniently cut to a size that permits easy assembly into a frame slightly larger than automobile 21. One type of fitting 41 is shown in FIG. 6 and may be merely injected molded bodies 43 having openings 45 of a size and depth to accept tube ends 33 and rods 39 in a tight fit.

A lower frame 47 is made from a plurality of hollow bendable tube 49 attached together in end-to-end fashion with fittings 41 to form an enclosed frame of a shape identical to upper frame 37 and the outer shape of automobile 21. Rods 49 should be hollow and preferably made of plastic. They may be conveniently cut to a size that permits easy assembly into a frame slightly larger than automobile 21. Frame 47 is positioned below upper frame 37 and is arranged to set about vehicle perimeter 35, shown in phantom line, about one inch above floor 13 when the cover is lowered over vehicle 21. A series of weights 51 are inserted in tubes 49 to help hold lower frame 47 near carport floor 13 and to provide stability during use in gusty winds, see FIG. 7.

Figure 7:
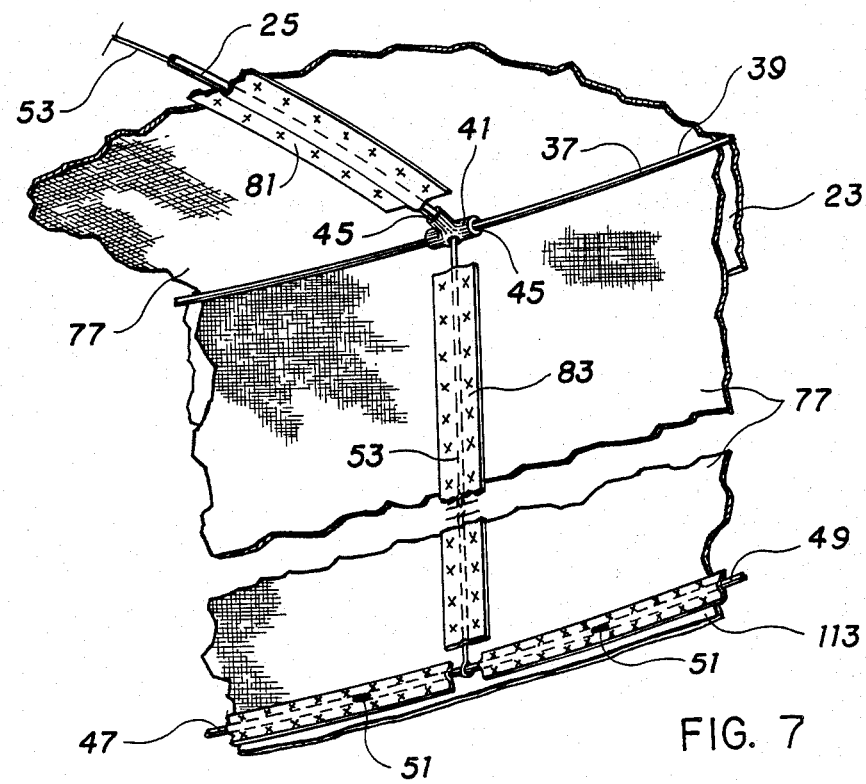
FIG. 7 is another illustrative view, this time from underneath the cover, showing the upper frame rods joined to the lower frame rods by the cover control line.

A series of cover control lines 53 are attached at various points 55 to lower frame 47 preferably just below where hollow tubes 25 terminate in fittings 41, see FIG. 7. They are directed upward into fittings 41 and into hollow tube second ends 33, through tubes 25 and out first ends 31 and up through the open center of hub 27 toward overhead structure 3. Control lines 53 may be small diameter ropes, braided filament lines or single filament (monofilament) lines. The total weight of the cover, frames and associated components is quite small and there is preferred about eight hollow tubes 25 so that the weight borne by each control line 53 is rather moderate.

A freely-rotating split shaft 57a and 57b is rotatably mounted on a rod 59 in bearings 61 and support arms 63 adjacent overhead structure 3 by known means such as adhesives, bolts, screws, etc. A series of circumferential grooves 65 are formed in shaft 57 to receive control lines 53 and prevent them from drifting or "running out" on shaft 57. A center section 67 is positioned in between shaft sections 57a and 57b so as to turn independent therefrom.

A height-control line 69 is attached between overhead structure 3 and hub 27. Its function is to set the height of hub 27 above the roof of automobile 21. For automobiles of different height, it may be necessary to alter the length of line 69. Preferably, control line 69 is connected between hub 27 and center shaft section 67.

Figure 5:
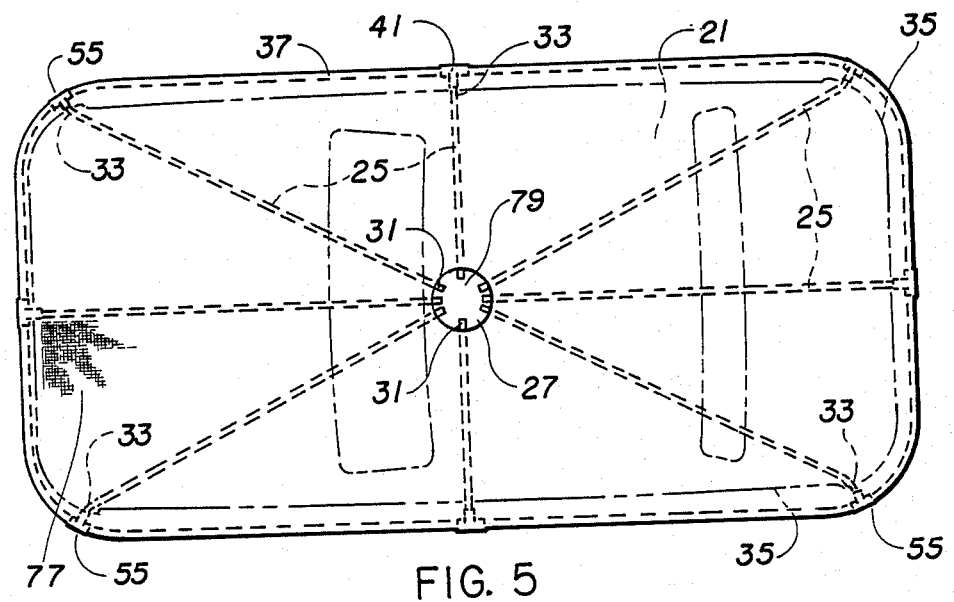
FIG. 5 is a top plan view of the cover lowered over the vehicle taken along lines 5—5 in FIG. 2.
Figure 8:
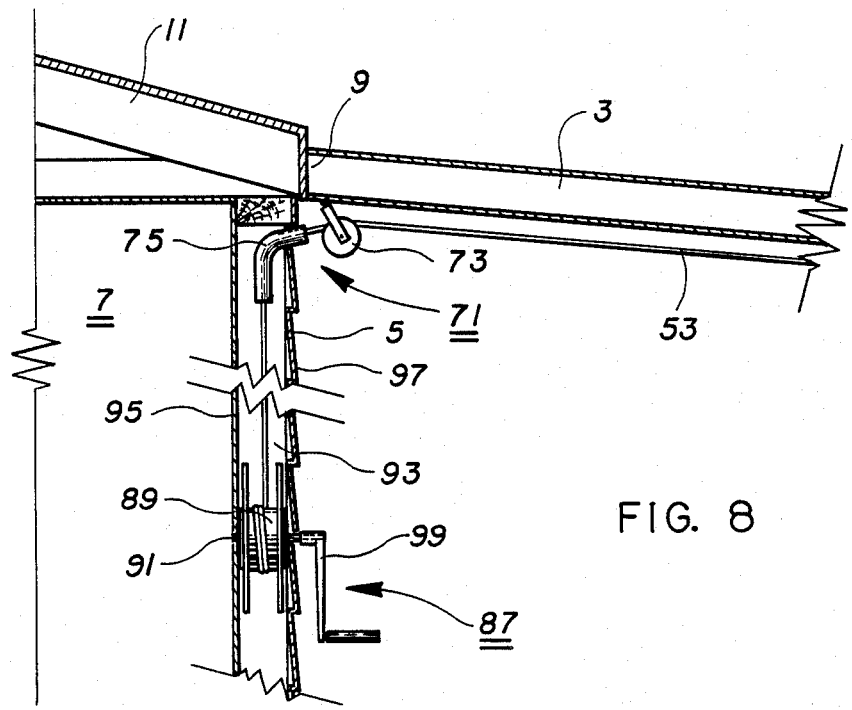
FIG. 8 is an elevational, partially sectional, view of another embodiment of the means for raising and lowering the cover; and, FIG. 9 is an illustrative view of a method of holding the control line in sliding contact with the cover.

A first means 71 is provided to direct control lines 69 from shaft 57 to one (either) side of carport 1. As shown in FIG. 8, means 71 may be a pulley 73, mounted adjacent home side wall 5 or overhead support structure or roof 3, or be a series of bent tubes 75 passing through wall 5 or a combination of them. A sheet-like cover 77 of nylon cloth, parachute material or other like material is arranged over thin-walled hollow tubes 25 and downward from second tube ends 33 over upper frame 37 and down over lower frame 47 to about one inch below lower frame 47 to reach carport floor 13 for the purpose of covering vehicle 21 from the roof to carport floor 13. As shown in FIG. 5, cover 77 has a central aperture 79 positioned over the open center of hub 27 through which control lines 53 pass (upward) to shaft 57. As shown in FIG. 7, tubes 25 may be attached to cover 77 by narrow strips 81 of covering material sewn along their respective edges as indicated by the lines of "x's". Likewise, control lines 53 may be held in sliding contact against cover 77, as it drops from second tube ends 33 to lower frame 47 by the use of other narrow strips 83 sewn the same way.

Figure 9:
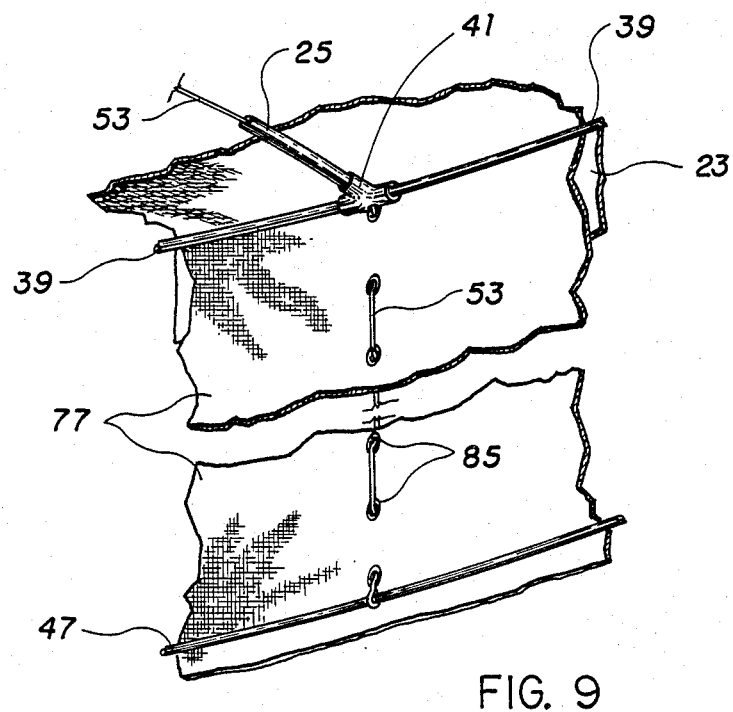

An alternate form of holding control lines 53 in sliding contact to cover 77 is shown in FIG. 9 by the use of series of spaced-apart rimmed apertures 85 such as eyelets through which lines 53 may be passed alternately inward and outward in descending pattern toward lower frame 47.

A second means 87 is provided for winding and unwinding control lines 53 to raise and lower cover 77 over automobile 21. As shown in FIG. 8, second means may comprise a reel 89 mounted on a shaft 91 in space 93 between inner house wall 95 and outer house wall 97 and made operable by a crank handle 99 for winding control lines 53 on reel 89. As an alternate embodiment, a motor-driven winch may be substituted for crank handle 99 and reel 89 for automatic or semi-automatic raising and lowering of cover 77. A cleat 101 may be provided and attached to wall 5 on which to wind and snub control lines 53.

Figure 3:
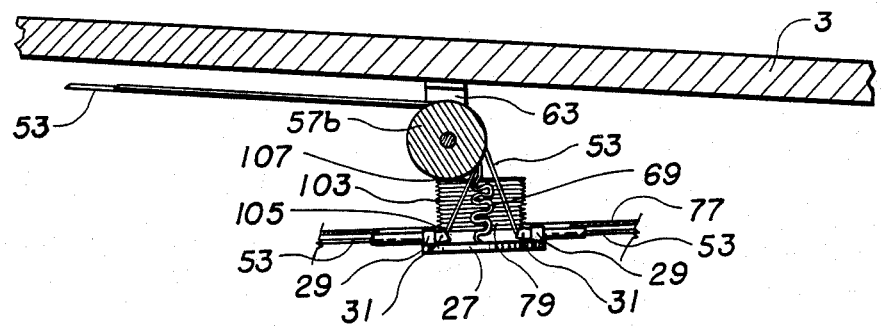
FIG. 3 is an end elevational view of the central assembly of the cover taken along lines 3—3 in FIG. 4.

A collapsible tubular cover 103 is preferably attached at its terminal ends 105 and 107 to overhead structure 3 and hub 27, respectively for surrounding control lines 53 and height control line 69 to keep them from view. Such a feature also lowers the wind's effect on the stability of cover 77 when it is lowered over automobile 21. Such a cover 105 may be made conveniently out of a thin, opaque sheet of plastic film wrapped around a coil of thin, spring steel wire and such are known in the art. In the retracted mode, cover 103 collapses to a short folded tube as shown in FIG. 3.

Valance 23 is attached to cover 77 outboard of the ends 33 of tubes 25 to hang down along with cover 77 from upper frame 37 down toward but not reaching lower frame 47. In the retraction and storage configuration shown in FIG. 4, valance 23 covers over the folded cover 77 to hide it from view.

Figure 4:
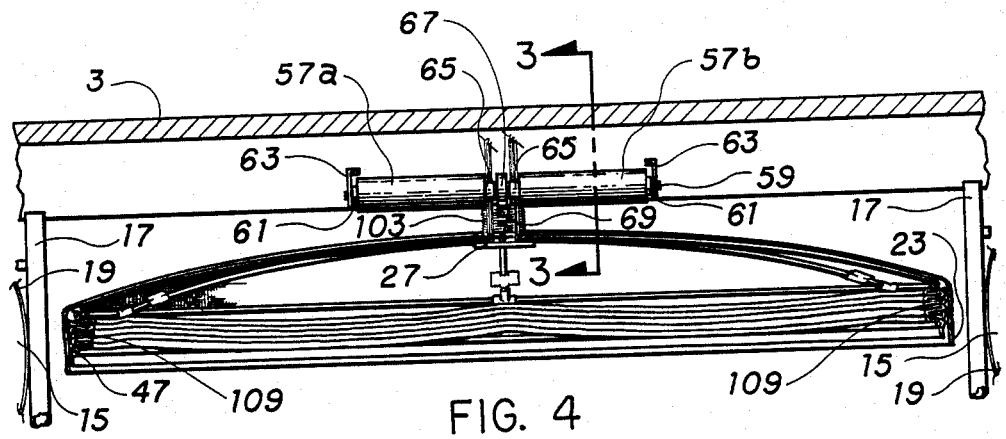
FIG. 4 is a side elevational view, partially in section, of the cover retracted into storage taken along lines 4—4 in FIG. 1.

In operation, cover 77, upper frame 37, lower frame 47 and weights 51, if any, are selected to make hollow tubes 25 droop or bend downward toward second tube ends 33, as shown in FIG. 2, to provide an umbrella effect and cause cover 77 to more closely fit over automobile 21 in its lowered position. When retracted, control lines 53 pull lower frame 47 up to upper frame 37 and collapse the lower outside portion of cover 77 into a series of folded pleats 109 to be hidden from view by valance 23 as shown in FIG. 4.

What is claimed is:

1. A cover and apparatus for raising and lowering it from an overhead structure to a vehicle parked thereunder, comprising:
   (a) a plurality of thin-walled, hollow tubes extending outward in radial pattern from a position centered over where the vehicle is to be parked, each tube having a first end retained on a hub and having a second end terminating slightly beyond the outer perimeter of the vehicle in spaced-apart arrangement thereabout;
   (b) an upper frame comprising a plurality of bendable rods attached together in end-to-end fashion for attachment to said second ends of said rods for positioning slightly outboard of the perimeter of the vehicle;
   (c) a lower frame comprising a plurality of bendable tubes attached together in end-to-end fashion for positioning slightly outboard of the perimeter of the vehicle near the surface on which the vehicle is parked;
   (d) a series of cover control lines attached at various points to said lower frame, each passing upward therefrom to said second ends of said tubes, through said tubes inward toward said hub, outward from said first tube ends and upward toward the overhead structure;
   (e) a freely rotating shaft rotatably mounted adjacent the overhead structure having grooves formed about the circumference thereof for receipt of said control lines;
   (f) a height control line attached between said hub and the overhead structure of a length sufficient to retain said hub at a preselected distance above the vehicle when lowered by said control lines;
   (g) first means for gathering and directing said control lines from said shaft to one side of the overhead structure and then downward therefrom;
   (h) a sheet-like cover arranged out over said thin-walled hollow tubes and downward from said second ends thereof from said upper frame to said lower frame and then to the floor on which the vehicle is parked to cover the vehicle parked thereunder when said hub, rods and frames are lowered by said control lines and to fold up under said upper frame in curtain-fashion when said control lines are retracted up over said shaft to raise said hub, rods, frames and cover to the overhead structure, wherein the weight of said cover, frame and control lines sufficient to curve said hollow tubes downward in an umbrella fashion over the vehicle;
   (i) second means for winding and unwinding said control lines in regulated fashion to raise and lower said cover over the vehicle; and,
   (j) a valance extending downward from said cover, outboard said upper frame, to act as a cover, when said upper and lower frames are brought together by said retracted control lines, to hide the stored cover from external view.

2. The cover and apparatus of claim 1 including a collapsible tubular cover attached between the overhead structure and said hub and arranged to cover said control lines and said height adjustment line.

3. The cover and apparatus of claim 1 including a narrow strip of covering material underlaid said bendable tubes and attached along their edges to said cover to hold said cover in fixed arrangement with said tubes.

4. The cover and apparatus of claim 1 including narrow strips of covering material spanning said control lines where adjacent said cover and attached along their edges to said cover to maintain said control lines in fixed, sliding arrangement with said cover.

5. The cover and apparatus of claim 1 including a series of rimmed apertures formed in said cover, from where said cover encounters said second ends of said tubes downward toward said second frame, for receipt therethrough of said control lines to maintain said control lines in fixed, sliding arrangement with said cover.

6. The cover and apparatus of claim 1 including a series of weights distributed along said lower frame to aid in holding said cover down over the vehicle.

7. The cover and apparatus of claim 1 wherein said first means includes a pulley attached adjacent the overhead structure and spaced-apart from one side thereof for directing said control lines to the side of the carport and downward therefrom.

8. The cover and apparatus of claim 1 wherein said second means includes a fastening cleat on which to snub said control lines.

9. The cover and apparatus of claim 1 wherein said second means includes a hand crank on which to wind said control lines.

10. The cover and apparatus of claim 1 wherein said second means includes a power-driven winch on which to wind said control lines.

11. The cover and apparatus of claim 1 including a skirt of cover material depending from said second frame to the floor of the carport to aid in keeping the automobile free of dust and dirt.

* * * * *